United States Patent
DiSalvo et al.

(10) Patent No.: US 9,359,204 B2
(45) Date of Patent: Jun. 7, 2016

(54) MESOPOROUS METAL NITRIDE MATERIALS AND METHODS

(71) Applicants: Francis DiSalvo, Ithaca, NY (US); Minghui Yang, Ithaca, NY (US); Michelle MacLeod, Ithaca, NY (US)

(72) Inventors: Francis DiSalvo, Ithaca, NY (US); Minghui Yang, Ithaca, NY (US); Michelle MacLeod, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/354,001

(22) PCT Filed: Oct. 23, 2012

(86) PCT No.: PCT/US2012/061426
§ 371 (c)(1),
(2) Date: Apr. 24, 2014

(87) PCT Pub. No.: WO2013/062938
PCT Pub. Date: May 2, 2013

(65) Prior Publication Data
US 2014/0302323 A1    Oct. 9, 2014

Related U.S. Application Data

(60) Provisional application No. 61/550,566, filed on Oct. 24, 2011.

(51) Int. Cl.
*C01B 21/082*    (2006.01)
*C01B 21/06*    (2006.01)
*C01B 21/076*    (2006.01)

(52) U.S. Cl.
CPC ............ *C01B 21/0821* (2013.01); *C01B 21/06* (2013.01); *C01B 21/062* (2013.01); *C01B 21/0617* (2013.01); *C01B 21/076* (2013.01); *C01P 2002/60* (2013.01); *C01P 2002/72* (2013.01); *C01P 2002/76* (2013.01); *C01P 2002/77* (2013.01); *C01P 2004/03* (2013.01); *C01P 2006/12* (2013.01); *C01P 2006/14* (2013.01); *C01P 2006/16* (2013.01); *C01P 2006/40* (2013.01); *Y10T 428/2982* (2015.01)

(58) Field of Classification Search
CPC  C01B 21/0821; C01B 21/076; C01B 21/062; C01B 21/0617; C01B 21/06; Y10T 428/2982
USPC .......................... 428/402; 423/385, 409, 411
See application file for complete search history.

(56) References Cited

FOREIGN PATENT DOCUMENTS

| KR | 10-2000-0025412 | * | 5/2000 |
|---|---|---|---|
| KR | 20000025412 A | | 5/2000 |
| KR | 10-0964504 | * | 6/2010 |
| KR | 20100964504 B1 | | 6/2010 |
| KR | 10-2010-0074763 | * | 7/2010 |
| KR | 20100074763 A | | 7/2010 |

OTHER PUBLICATIONS

Dong, Shanmu et al: "Fcile Preparation of Mesoporous Titanium Nitride Microspheres for Electrochemical Energy storage" ACS Appl. Mater. Iterfaces. Dec. 10, 2010, vol. 3, No. 1, pp. 93-98.*
Du, Yinxiao et al: "Facile Solid-State Synthesis Rout to Metal Nitride Nanoparticles" J. Mater. Sci. Technol. 2008, vol. 24, No. 5, pp. 737-741.*
Dong et al., "Facile Preparation of Mesoporous Titanium Nitride Microspheres for Electrochemical Energy Storage", 2011, Vol. 3, No. 1, pp. 93-98.
Du et al., "Facile Solid-State Synthesis Route to Metal Nitride Nanoparticles", 2008, J. Mater. Sci. Technol., vol. 24, No. 5, pp. 737-741.
Yang et al., "Nanoporous metal (Oxy)Nitrides for Electronic Devices", Cornell University, Ithaca, New York ACS meeting San Diego, Mar. 28, 2012
Yang et al., "Mesoporous Metal Nitride Materials Prepared From Bulk Oxides", Department of Chemistry, Cornell University, Ithaca, New York 14853, pp. 1-22.
Bang, et al., Dual Templating Synthesis of Mesoporous Titanium Nitride Microspheres, Adv. Mater. 2009, 21, pp. 3186-3190.
Toberer, et al., Spontaneous Formation of Macroporous Monolighs of Mesoporous manganese Oxide Cyrstals, Adv. Mater. 2005, 17, pp. 2244-2246.

* cited by examiner

*Primary Examiner* — Leszek Kiliman
(74) *Attorney, Agent, or Firm* — William Greener; Alek P. Szecsy; Bond, Schoeneck & King, PLLC

(57) ABSTRACT

A plurality of mesoporous metal nitride materials may be formed by a method that includes treating with ammonia (or a related bonded nitrogen and hydrogen containing reducing material) a mixed metal oxide material that comprises at least one first metal that forms an unstable product with ammonia and at least one second metal that forms a stable product with ammonia to form the metal nitride materials that include the second metal but not the first metal. The method contemplates forming metal nitride materials, as well as metal oxynitride materials. A related method that uses a non-bonded nitrogen and hydrogen containing reducing material may yield a mesoporous metal oxide. In particular the at least one metal that forms an unstable product with ammonia comprises zinc metal.

23 Claims, 4 Drawing Sheets

MESOPOROUS METAL NITRIDE MATERIALS AND METHODS

CROSS-REFERENCE TO RELATED APPLICATION

This application is related to, and derives priority from, U.S. Provisional Patent Application Ser. No. 61/550,566, filed 24 Oct. 2011, and titled Mesoporous Metal Nitride Materials and Methods, the content of which is incorporated herein fully by reference.

STATEMENT OF GOVERNMENT INTEREST

The research that lead to the embodiments as described herein, and the invention as claimed herein, was funded by the National Science Foundation under grant number DMR-0602526. The United States Government has rights in the invention as claimed herein.

BACKGROUND

1. Field of the Invention

Embodiments relate generally to metal nitride materials. More particularly, embodiments relate to mesoporous metal nitride materials.

2. Description of the Related Art

Metal nitrides and metal oxynitrides (i.e., collectively referred to as metal nitride materials) often display a wide variety of interesting and useful chemical and physical properties. The preparation of metal nitride materials is more challenging than that of pure metal oxides (i.e., other than metal nitrides and metal oxynitrides), since the latter can be prepared in air, while the former often requires the rigorous exclusion of oxygen and water from a synthesis process. In light of their interesting and useful chemical and physical properties, desirable are additional metal nitride materials and additional methods for preparing the additional metal nitride materials.

SUMMARY

Embodiments provide a plurality of mesoporous metal nitride materials and a method for preparing the plurality of mesoporous metal nitride materials. The mesoporous metal nitride materials and related method in accordance with the embodiments may be used to prepare mesoporous metal nitrides, as well as mesoporous metal oxynitrides. Within the context of the embodiments, mesoporous materials, and in particular mesoporous metal nitride materials, are generally understood to have a pore size from about 2 to about 100 nanometers.

Basically, the method for preparing the plurality of mesoporous metal nitride materials in accordance with the embodiments includes a thermal ammonolysis (or a related bonded nitrogen and hydrogen containing reducing material treatment) method that treats with ammonia (or a related bonded nitrogen and hydrogen containing reducing material) a mixed metal oxide material that includes at least one first metal that forms an unstable (i.e., generally, and more specifically, volatile) reaction product with ammonia and at least one second metal that forms a stable (i.e., generally, and more specifically, non-volatile) reaction product with ammonia, to provide the metal nitride material that includes the stable reaction product (i.e., that includes the at least one second metal) but not the unstable reaction product (i.e., that includes the at least one first metal).

As a result of investigations directed towards reactions related to the foregoing ammonolysis reactions, the embodiments also provide a method for preparing a metal oxide material with a specific and desirable porosity. This particular method is realized by using a non-bonded nitrogen and hydrogen containing reducing material, such as but not limited to forming gas, rather than a bonded nitrogen and hydrogen containing reducing material, such as but not limited to ammonia, when treating a mixed metal oxide material that includes the at least one first metal that forms the unstable reaction product with ammonia and the at least one second metal that forms the stable reaction product with ammonia.

Within the context of the embodiments and of the claims, a bonded nitrogen and hydrogen containing reducing material is intended as including nitrogen and hydrogen with a nitrogen to hydrogen bond, such as but not limited to ammonia, hydrazine, urea, methylamine and other amine materials, as indicated below. Within the context of the embodiments and of the claims, a non-bonded nitrogen and hydrogen containing reducing material is intended as including nitrogen and hydrogen absent a nitrogen to hydrogen bond, such as but not limited to forming gas.

A particular metal nitride material in accordance with the embodiments includes a metal nitride material having a pore size from about 10 to about 50 nanometers.

A particular method for preparing a metal nitride material in accordance with the embodiments includes treating with a bonded nitrogen and hydrogen containing reducing material a mixed metal oxide material including at least one first metal susceptible to forming an unstable reaction product with the bonded nitrogen and hydrogen containing reducing material and at least one second metal susceptible to forming a stable reaction product with the bonded nitrogen and hydrogen containing reducing material to provide a mesoporous metal nitride material that includes the at least one second metal and excludes the at least one first metal.

Another particular method for preparing a metal nitride material in accordance with the embodiments includes treating with ammonia a mixed metal oxide material including a first metal selected from the group consisting of Zn, an alkali metal, Cd, Hg and Pb susceptible to forming a volatile reaction product with ammonia and at least one second metal selected from the group consisting of Ti, V, Nb, Ta, Cr, W, Mo, Al, Ge and Ga susceptible to forming a stable reaction product with ammonia to provide a mesoporous metal nitride material that includes the at least one second metal and excludes the at least one first metal.

A particular method for preparing a metal oxide material in accordance with the embodiments includes treating with a non-bonded nitrogen and hydrogen containing reducing material a mixed metal oxide material including at least one first metal susceptible to forming an unstable reaction product with the non-bonded nitrogen and hydrogen containing reducing material and at least one second metal that is susceptible to reduction with respect to the non-bonded nitrogen and hydrogen containing reducing material to provide a mesoporous metal oxide material that excludes the at least one first metal and includes the at least one second metal.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Figure 1:
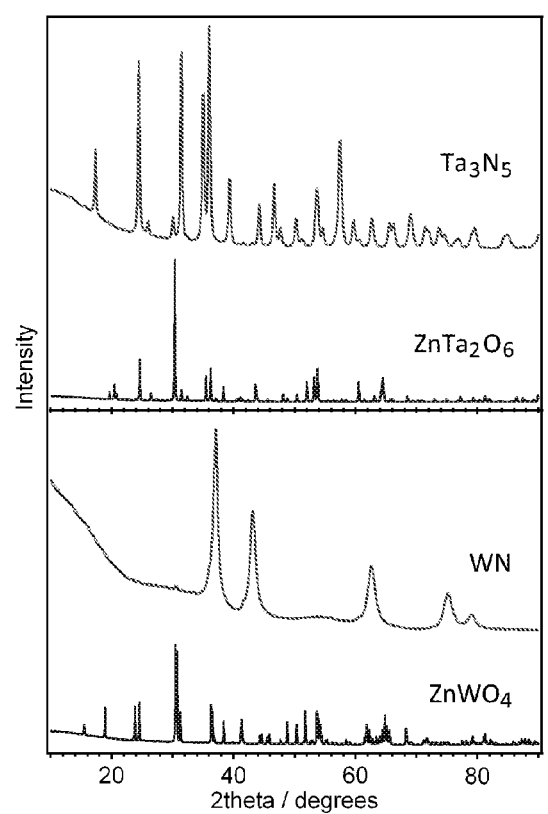
FIG. 1 shows powder x-ray diffraction (PXRD) patterns illustrating the results of ammonolysis of $ZnTa_2O_6$ and $ZnWO_4$ for 8 hr with ammonia flow (200 cm$^3$ min$^{-1}$) at 700 and 800° C., respectively.

Embodiments provide a synthetic route for preparing mesoporous metal nitride materials by the ammonolysis of bulk multication metal oxide precursor materials $Zn_xM_yO_a$ (hereafter referred to as ZMO). At temperatures above 500° C., Zn sublimes out of the product and three $O^{2-}$ anions are replaced by two $N^{3-}$ anions, thus generating metal nitride materials (i.e., metal nitrides or metal oxynitrides) containing mesopores. In many cases, additional nitrogen is lost due to auto-reduction of the metal. This method may also be extended to using metals other than Zn. If M' in compounds $M_x'M_yO_a$ can form volatile species (as elemental metals or amides), then a nanoporous $MN_b$ product may form at modest temperatures.

Embodiments also provide a method for preparing mesoporous metal oxide materials through a related synthetic route that uses a non-bonded nitrogen and hydrogen containing reducing material, such as but not limited to forming gas, in comparison with the bonded nitrogen and hydrogen containing reducing material, such as but not limited to ammonia.

In accordance with the above, the embodiments utilize as a starting material a mixed metal oxide material (i.e., a multication metal oxide material) comprising at least one first metal that yields an unstable reaction product with a bonded nitrogen and hydrogen containing reducing material (i.e., such as but not limited to ammonia) and at least one second metal that yields a stable reaction product with the bonded nitrogen and hydrogen containing reducing material (i.e., such as but not limited to ammonia). Within the context of the embodiments, preferably the at least one first metal includes Zn, although other possible candidates for a first metal are not excluded. Such other possible candidates for the first metal may include, but are not necessarily limited to alkali metals (i.e., Li, Na, K, Rb, Cs and Fr), Cd, Hg and Pb. In addition, the at least one second metal that yields the stable reaction product with the bonded nitrogen and hydrogen containing reducing material may be selected from the group including but not limited to Ti, V, Nb, Ta, Cr, W, Mo, although additional second metals such as but not limited to Al, Ga and Ge may also be considered. Finally, although the embodiments are most specifically illustrated within the context of a bonded nitrogen and hydrogen containing reducing material that comprises or consists of ammonia, the embodiments also contemplate alternative bonded nitrogen and hydrogen containing reducing materials, such as but not limited to hydrazine, urea, methylamine and other amines.

Within the context of the embodiments, a particular nitrogen substitution reaction with respect to a mixed metal oxide is undertaken at a temperature at least about 400° C. and more preferably from about 500 to about 1000° C. to provide at least partial nitrogen substitution for oxygen and thus form at least an oxynitride, or possibly a nitride that might contain perhaps 20% or less oxygen impurities, from the mixed metal oxide starting material. At further elevated temperatures and/or elongated reaction times, nitride formation is favored over oxynitride formation. When utilizing ammonia as the bonded nitrogen and hydrogen containing reducing material, the embodiments contemplate a flow rate of ammonia within a reactor chamber from about 10 to about 1000 cc/min and a reaction chamber pressure from about 1 to about 10,000 ton.

The foregoing reaction conditions will typically provide from a mixed metal oxide starting material a resulting metal nitride material having a pore size from about 2 to about 50 nanometers, within the context of a grain size from about 0.1 to about 200 microns.

With respect to forming mesoporous metal oxides while using a non-bonded nitrogen and hydrogen containing reducing material, such as but not limited to forming gas, the same reaction temperatures and elongated reaction times may also be employed to form a mesoporous structure incident to loss of the at least one first metal, but absent substitution of nitrogen for oxygen within a resulting mesoporous metal oxide.

A. Experimental Procedure

1. Syntheses

ZMO precursors were prepared by a solid state reaction of a stoichiometric mixture of binary powders of ZnO and the appropriate metal oxide powder at temperatures between 800 to 1400° C. These ZMO oxides (0.2 to 0.3 g) were first placed in an alumina boat. The boat was then placed in a silica tube with air tight stainless steel end caps that had welded valves and connections to input and output gas lines. All gases were purified to remove trace amounts of oxygen or water using copper, nickel, palladium and platinum on zeolite supports. The silica tube was then placed in a split tube furnace and the appropriate connections to gas sources made. Argon gas was passed over the sample for 15 min to expel air before establishing a flow of ammonia gas (Anhydrous, Air Gas). The sample was heated to the above reaction temperatures at 150° C./hr. After treatment for the specified period, the furnace power was turned off and the product cooled to room temperature in ~4 hr under an ammonia flow. Before the silica tube was taken out of the split tube furnace, argon gas was flowed through the silica tube to expel the ammonia gas. The silica tube was left for 24 hr with one valve open in order to expose the ammonolysis product to air slowly. This latter procedure resulted in the formation of only a very thin oxide on the nitride surface.

2. Characterization

Finely ground powders were examined with a Rigaku Ultima VI powder X-ray diffractometer (PXRD) with $CuK_\alpha$ radiation ($K_{\alpha 1}$, $\lambda$=1.5406 Å and $K_{\alpha 2}$, $\lambda$=1.5444 Å). Crystal structures of the oxides and resultant nitrides were confirmed by PXRD profiles using the GSAS package. Scanning electron microscopy (SEM) and energy dispersive X-ray analysis (EDX) were performed with a LEO-1550 field emission SEM (FSEM). In-situ particle cutting was conducted by using an FEI scanning/transmission electron microscopes (STEM) with a dual beam focused ion beam (FIB).

Nitrogen adsorption/desorption isotherms were measured at −196° C. using a Micromeritics ASAP 2020 system. The samples were degassed at 200° C. for 10 hr on a vacuum line.

Elemental analyses of nitrogen and oxygen content of nitride samples were determined with a LECO TC-600 analyzer using the inert gas fusion method. Nitrogen was detected as $N_2$ by thermal conductivity and oxygen as $CO_2$ by infrared detection. The apparatus was calibrated using Leco® standard oxides, and $Si_2N_2O$ and TaN as nitrogen standards.

The nitride crystalline domain size can be estimated from a Rietveld fit of the broadened Lorentzian X-ray line shape in GSAS, according to:

$$P = \frac{18000 K \lambda}{\pi Lx}$$

where P is the domain size in nm. K is the Scherrer constant, 0.9 in this case. Lx was calculated from the Lorentzian function in GSAS.

B. Results and Discussion

1. Ammonolysis of ZMO Precursors

The embodiments included ZMO precursors in which M=Ti, V, Nb, Ta, Cr, W, Mo and where all readily form metal (oxy)nitrides by ammonolysis. The phase purity of the ternary oxide precursors was confirmed (>97%) by powder X-ray diffraction (PXRD). These precursor oxides were prepared at high enough temperatures to produce large grain sizes, mostly in the 1 to 20 μm range. Ammonolysis of these oxides was carried out for a range of temperatures between 500 to 1000° C. and times of 8 to 30 hr at an ammonia flow rate of 200 $cm^3$ $min^{-1}$ through a 1 inch diameter silica flow tube. Typically a few hundred milligrams of oxide were used in each ammonolysis reaction.

Above 500° C. and with increasing time or temperature, one may generally observe the formation of metal (oxy)nitrides ($MN_aO_b$, where a+b≈1) that generally adopt the rock-salt structure. The refined cell parameters determined by PXRD are summarized in Table 1.

TABLE 1

Summary of ammonolysis conditions, refined lattice parameters and calculated domain size of pure metal (oxy)nitrides (MN): all reactions are at an ammonia flow rate of 200 $cm^3min^{-1}$. $Ta_3N_5$ crystallized in space group Cmcm, all others MN (M = Cr, V, Ti, Nb and W) crystallized in space group Fm3m. Units for temperature and reaction time are degree Celsius (C.) and hour (hr), respectively; *lattice parameters b and c for $Ta_3N_5$ are 10.2115(1) and 10.2748(1) Å.

| Precursor | Temp. & time | MN | a/Å | Domain size/nm |
|---|---|---|---|---|
| $ZnCr_2O_4$ | 800 C., 30 hr | CrN | 4.1481(1) | 73 |
| $ZnTa_2O_6$ | 800 C., 8 hr | $Ta_3N_5$ | 3.8898(1)* | 36 |
| $Zn_2V_2O_7$ | 600 C., 8 hr | VN | 4.1279(1) | 29 |
| $Zn_2TiO_4$ | 800 C., 8 hr | TiN | 4.2200(1) | 25 |
| $Zn_3V_2O_8$ | 600 C., 8 hr | VN | 4.1294(1) | 48 |
| $ZnNb_2O_6$ | 800 C., 8 hr | NbN | 4.3233(1) | 20 |
| $Zn_3Nb_2O_8$ | 600 C., 8 hr | NbN | 4.3178(1) | 22 |
| $ZnWO_4$ | 700 C., 8 hr | WN | 4.1873(1) | 10 |

Under the reaction conditions employed here, the N content (a) in the product is substantially larger than the residual oxygen content (b). The products obtained when M=Ta or Mo are exceptions to the above. If the reaction temperature <950° C., when M=Ta, the final product is $Ta_3N_5$ (orthorhombic), which again contains a small amount of oxygen. When M=Mo, at 600 and 700° C., a mixture of hexagonal MoN (P⁻3m1) and cubic $Mo_2N$ (Pm⁻3m) is obtained. For simplicity one may refer to these products as "MN" or "$Ta_3N_5$" or "$Mo_2N$," without explicitly referring to any residual oxygen content. A discussion of oxygen content will continue later in this report. These $MN_aO_b$ products show relatively broad diffraction peaks due to the small crystalline domain sizes of the refractory nitrides (calculated domain sizes of 20 to 100 nm) as shown by the representative PXRD patterns from ammonolyses of two different ZMOs in FIG. 1. During ammonolysis a grayish powder was observed to deposit on the cooler parts of the silica flow tube downstream of the sample. This deposit formed only when $MO_aN_b$ was formed in the product and was determined to be Zn metal by PXRD. Under the appropriate conditions determined here, the expected mass loss due to the sublimation of Zn and the replacement of N by O is obtained. For example, the ammonolysis of 0.0975 g of $Zn_2TiO_4$ at 800° C. for 8 hr, yields 0.0266 g of TiN, which is the expected mass after the sublimation of Zn from and the replacement of four O by one N in the precursor oxide.

2. Mesoporous Microstructures

Figure 2:
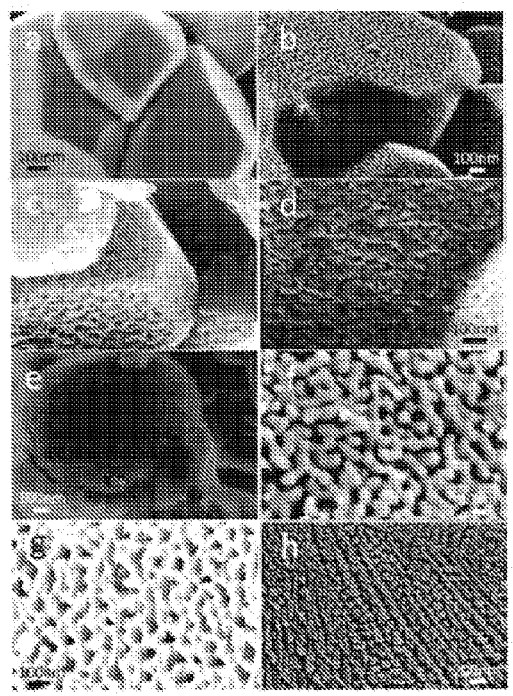
FIG. 2 shows SEM images of ammonolysis products of ZMO: all reactions were 8 hr except $ZnCr_2O_4$ was 24 hr (c) at temperatures respectively for (a) $ZnCr_2O_4$ at 600° C., (b, c) $ZnCr_2O_4$ at 800° C., (d) $ZnTa_2O_6$ at 800° C., (e) $Zn_2V_2O_7$ at 500° C., (f) $Zn_2V_2O_7$ at 800° C., (g) $Zn_2TiO_4$ at 600° C., (h) $Zn_2TiO_4$ at 800° C.

FIG. 2 shows the SEM images of representative ammonolysis products from different ZMO precursors. These show a variety of mesoporous structures that depend on the Zn mole fraction and the identity of M in the precursor. The ammonolysis product of $ZnCr_2O_4$ at 600° C. for 8 hr is shown in FIG. 2a. The crystal morphology is the same as the starting $ZnCr_2O_4$ and surface of the grains is smooth. Indeed, the PXRD pattern of the product shows only the unreacted $ZnCr_2O_4$. FIGS. 2b and 2c show the images obtained from $ZnCr_2O_4$ by ammonolysis at 800° C. for 8 and 24 hr, respectively. At this temperature, it is clear that a mesoporous structure has formed, while the overall gross morphology of the starting oxide crystallites is maintained.

According to the SEM images, the size of both the pores and crystalline features are 30-50 nm. The PXRD refinement of the 8 hr product shows 30% CrN was formed and that the average nitride crystalline domain size is 48 nm; the remaining material is unreacted $ZnCr_2O_4$. As suggested by the SEM images, only the surface of the oxide grains is covered by the mesoporous CrN. With further ammonolysis at 800° C., the mole fraction of CrN increased to >90% in the 24 hr sample and the CrN domain size increased to 64 nm. At 1000° C. for 8 hr, the product is single phase CrN that has coarsened to form larger pores and much larger CrN grains with a calculated domain size of 113 nm.

FIG. 2d shows mesoporous $Ta_3N_5$ from ammonolysis of $ZnTa_2O_6$ at 800° C. for 8 hr. According to PXRD, it is single phase and crystallized in the expected orthorhombic structure with an average domain size of nearly 50 nm. The PXRD of the ammonolysis product of $Zn_2V_2O_7$ at 500° C. for 8 hr shows two phases: 60% ZnO and 40% VN with a calculated domain size of 10 nm. According to the SEM image shown in FIG. 2e, the ammonolysis product of $Zn_2V_2O_7$ at 500° C. forms a porous structure (about 20 nm in diameter) of VN with a second phase of ZnO in close contact with the VN. FIG. 2f shows the mesoporous features of the ammonolysis product of $Zn_2V_2O_7$ at 800° C. for 8 hr. Based on the refinement of the PXRD, the $Zn_2V_2O_7$ at 800° C. was fully converted to VN with a domain size of 42 nm and pore diameters of a similar size.

FIG. 2g shows the ammonolysis product of $Zn_2TiO_4$ obtained at 600° C. for 8 hr, the surface of $Zn_2TiO_4$ clearly starts to form a mesoporous structure. However, there is no sign of a nitride phase in the PXRD, only the starting oxide is observed. This suggests the porous coating is very thin (<2 vol %), below the mole fraction detectable by the PXRD. At 800° C., as shown in FIG. 2h, a mesoporous structure is visible and the PXRD shows single phase rocksalt structure TiN with a domain size of 25 nm. As we will see later this product still contains some oxygen and has an average composition of $TiN_{0.88}O_{0.12}$. This is consistent with previous observations that nitrides produced from ammonolysis of oxides often contain residual amounts of oxygen.

Figure 3:
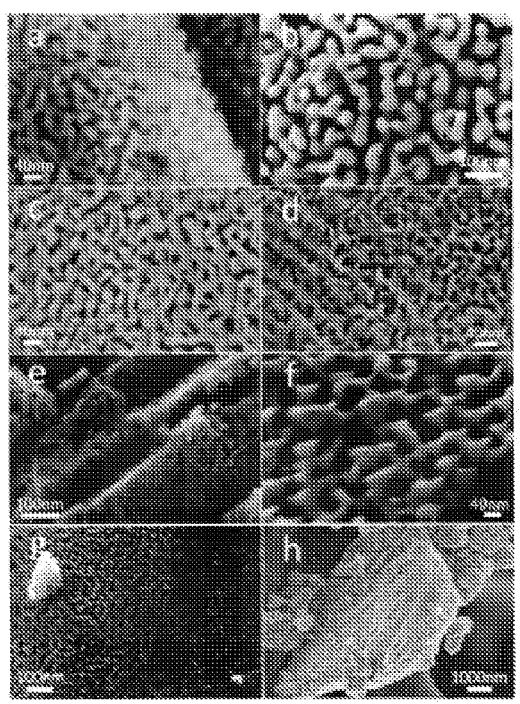
FIG. 3 shows SEM images of pure MN from ammonolysis of ZMO: (a) $Zn_2V_2O_7$ at 600° C., (b) $Zn_3V_2O_8$ at 800° C., (c) $Zn_3Nb_2O_8$ at 600° C., (d) $ZnWO_4$ at 700° C. and (e) $ZnV_2O_4$ at 800° C. for 8 hr (f) $ZnCr_2O_4$ at 800° C. for 30 hr, (g) $ZnTiNb_2O_8$ at 700° C. for 8 hr, (h) $Zn_2TiO_4$ at 800° C. for 8 hr: cut by FIB and 45 deg tilted.

FIG. 3 shows SEM images of single phase (by PXRD) MN products obtained from the ammonolysis of other ZMOs. Ammonolysis of $Zn_2V_2O_7$ at 600° C. for 8 hr (FIG. 3a) and $Zn_3V_2O_8$ at 800° C. for 8 hr (FIG. 3b) form VN with different mesoporous features. The later sample contains larger pores but also more pore volume. According to PXRD, the calculated domain sizes of VN for these two products are 29 and 49 nm, respectively. Ammonolysis of $Zn_3Nb_2O_8$ at 600° C., $ZnWO_4$ at 700° C. and $ZnV_2O_4$ at 800° C. for 8 hr, were also found to form crystalline MN with different mesoporous morphologies as shown in FIG. 3(c, d, e), respectively. The calculated domain sizes of MN are summarized in Table 1. The mesoporous features found on the particle surfaces of the ammonolysis product obtained at 800° C. for 8 hr coarsens somewhat when a pure CrN nanoporous product is obtained after 30 hr reaction time as shown in FIG. 3f.

The above SEM images show that in some cases the pores and particles both have rounded surfaces (see FIGS. 2f and 3b, for example) or the pores/particles show some faceting with preferred orientation (see FIGS. 2h and 3d, for example). Both types of pores have been observed in other systems. For example, rounded pores are found in dealloyed Ag—Au, while striking aligned faceting was found in single crystal MnO films produced by reduction of $ZnMn_2O_4$ in forming gas. The shape of the pores is expected to be a function of the surface diffusion rates and the difference of those rates on different facets of the product crystalline structure.

3. Reduction of ZMO Precursors

In order to compare the difference between reduction products and ammonolysis products, one may explore the reaction of related ZMOs with forming gas (i.e., 5 to 10 percent hydrogen gas in nitrogen gas). All samples were heated for 8 hr at different temperatures at a forming gas flow rate of 200 $cm^3$ $min^{-1}$. The PXRD indicates the reduction products of ZMOs heated at different temperature were reduced metal oxides. No nitride is formed under these conditions, since the kinetics of $N_2$ bond breaking at these reaction temperatures are very slow. Again Zn sublimes out of the precursors as summarized in Table 2.

TABLE 2

Summary of reduction conditions and porosity of reduction products of ZMO obtained by reaction with forming gas. Porosity is either present (Yes[y]) or not (NO[n]), temperature in ° C., lattice parameters and other crystal structure information are not presented here as the products are well known metal oxides. All the reactions were for 8 hr at a forming gas flow rate of 200 $cm^3$ $min^{-1}$.

| Chemical | Reduction temperature | Detected phase | Porosity |
|---|---|---|---|
| $ZnCr_2O_4$ | 800 | $ZnCr_2O_4$, $Cr_2O_3$ | N |
|  | 900 | $Cr_2O_3$, $ZnCr_2O_4$ | N |

TABLE 2-continued

Summary of reduction conditions and porosity of reduction products of ZMO obtained by reaction with forming gas. Porosity is either present (Yes[y]) or not (NO[n]), temperature in ° C., lattice parameters and other crystal structure information are not presented here as the products are well known metal oxides. All the reactions were for 8 hr at a forming gas flow rate of 200 $cm^3$ $min^{-1}$.

| Chemical | Reduction temperature | Detected phase | Porosity |
|---|---|---|---|
| $Zn_2V_2O_7$ | 500 | $ZnV_2O_4$ | Y |
|  | 600 | $ZnV_2O_4$ | Y |
|  | 700 | $ZnV_2O_4$, $V_2O_3$ | Y |
|  | 800 | 85% $V_2O_3$, 15% VO | Y |
| $Zn_3V_2O_8$ | 500 | $ZnV_2O_4$ | N |
|  | 600 | $ZnV_2O_4$ | Y |
|  | 700 | $V_2O_3$, $V_3O_4$ | Y |
| $Zn_2TiO_4$ | 600 | $Zn_2TiO_4$, $TiO_2$ | Y |
|  | 700 | $TiO_2$ | Y |
|  | 800 | $TiO_2$, $Ti_2O_3$ | N |
| $ZnTa_2O_6$ | 700 | $ZnTa_2O_6$, $Ta_2O_5$ | N |
|  | 800 | $Ta_2O_5$ | N |

Figure 4:
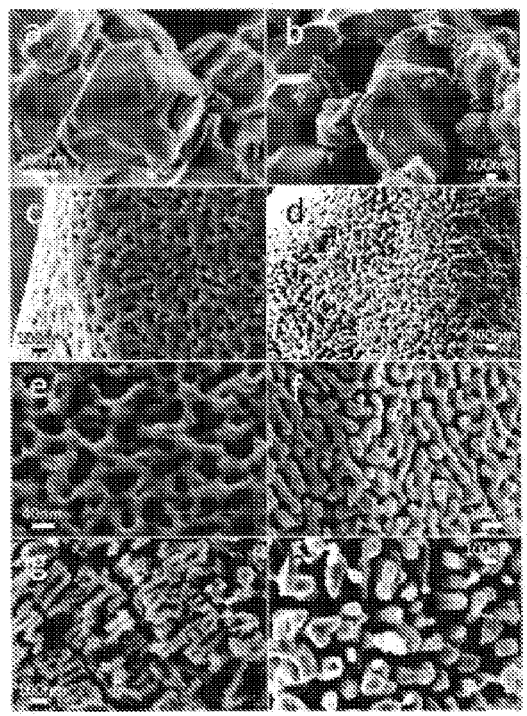
FIG. 4 shows SEM images of reduction products of ZMO obtained by reaction with forming gas: all reactions were 8 hr at temperatures respectively for (a) $ZnCr_2O_4$ at 800° C., (b) $ZnTa_2O_6$ at 700° C., (c) $Zn_2V_2O_7$ at 600° C., (d) $Zn_2V_2O_7$ at 700° C., (e) $Zn_3V_2O_8$ at 600° C., (f) $Zn_3V_2O_8$ at 700° C., (g) $Zn_2TiO_4$ at 600° C., (h) $Zn_2TiO_4$ at 700° C.

FIG. 4 shows SEM images of metal oxide products obtained from the reduction of ZMOs. FIG. 4a shows the reduction product of $ZnCr_2O_4$ at 800° C., the surface is smooth and PXRD shows predominantly $Cr_2O_3$ with some remaining $ZnCr_2O_4$. At 900° C., the product contains more $Cr_2O_3$ by PXRD; however, again no porosity is visible by SEM. $ZnTa_2O_6$ at both 700 (FIGS. 4b) and 800° C. also show no porosity with a smooth surface after reduction. In contrast, the reduction products of $Zn_2V_2O_7$ at 500-800° C. all exhibit porosity. The reduction of $Zn_2V_2O_7$ at 500° C. forms single phase $ZnV_2O_4$ as seen by PXRD. At 800° C., the Zn has completely sublimed out the precursor, forming vanadium oxide products ($V_2O_3$ and VO) with very clear porosity as shown in FIGS. 4c, 4d. FIG. 4e and 4f shows the surfaces obtained from $Zn_3V_2O_8$ at 600 and 700° C. As found for $Zn_2V_2O_7$, the reduction of $Zn_3V_2O_8$ first forms porous $ZnV_2O_4$ at lower temperature, then fully converts vanadium oxides at higher temperature. However, due to the higher ratio of Zn:V, the later clearly forms larger pores on its surface. FIGS. 4g and 4h show the reduction products of $Zn_2TiO_4$ at 600 and 700° C., respectively. $TiO_2$ begins to form at 600° C., and shows porosity on the surface. Single phase $TiO_2$ with mesoporous features forms at 700° C. after 8 hr. At higher temperature (800° C.), $Ti_2O_3$ begins to form and the mesoporous features are still observed.

4. Internal Mesoporous Morphologies

Ammonolysis product of $Zn_2TiO_4$ at 800° C. for 8 hr was selected for a detailed study of the mesoporous features. A single product particle ~8 μm across was cut using a Focused Ion Beam (FIB). After cutting, the particle was tilted for 45 deg as shown in FIG. 3h. Mesoporous features with similar morphology and length scale are visible in the section images, penetrating across the entire particle.

Figure 5:
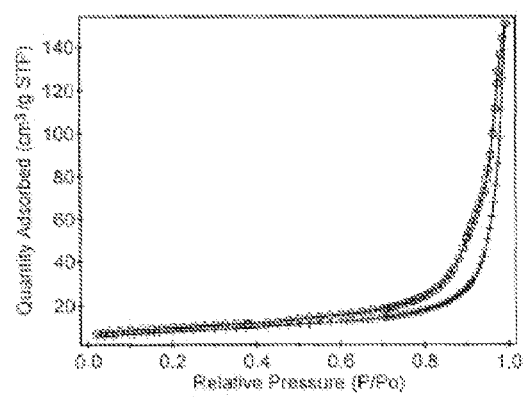
FIG. 5 shows a plot lot of $N_2$ absorption at 77 K for mesoporous TiN prepared at 800° C. for the BET surface area study.

To show that this bulk ammonolysis product is also fully mesoporous, one may carry out $N_2$ BET measurements at 77K for this TiN sample (see FIG. 5). The BET surface area of this 262 mg sample was 25.4±0.1 $m^2/g$. There is some microporosity (pore diameter ≤2 nm) that accounts for 5.6

$m^2/g$ and a micropore volume of $2.5 \times 10^{-3}$ $cm^3/g$. To put these numbers in perspective, one may compare the measured mesoporous area (~20 $m^2/g$) to that of uniformly divided cubes of TiN using the bulk density of 5.4 $g/cm^3$. A surface area of 20 $m^2/g$ would be produced by TiN cubes with ≈50 nm edges. This is the appropriate length scale seen in the0tures. Clearly the mesoporosity obtained is a feature of the bulk material and not just a surface phenomenon.

5. Chemical Analysis

Selected single phase MNs were checked by chemical analysis to determine the O/N ratio. Chem-analysis of the $Zn_2TiO_4$ derived product at 800° C. resulted in O: 3.93 wt % and N: 19.66 wt %, which gives an average composition of $TiN_{0.88}O_{0.15}$. Within experimental error the cation to anion ratio is 1.00+/−0.02. Since these samples were exposed to air and surface hydrolysis is expected to lead to a thin layer of surface oxide formation, the oxygen content in the interior of the nitride grains is expected to be lower than that found by analysis. Other ammonolysis products of ZMOs (M=V, Cr or Nb), show <3 wt % of oxygen in each sample.

6. Electrical Conductivity

Bulk transition metal nitrides are almost all good electrical conductors: exceptions include the semiconductors $Ta_3N_5$ and $Cu_3N$. A few reported values for rock salt nitrides are: $1.28 \times 10^4$ S/cm (TiN), $1.23 \times 10^4$ S/cm (VN), $0.59 \times 10^4$ S/cm (TaN), while a lower conductivity is found for WN ($3 \times 10^2$ S/cm). A simple apparatus that allows the four point probe measurement of conductivity of compressed powders as a function of applied pressure was used to estimate the conductivity of the compacted mesoporous powders. As expected the conductivity increased as a function of pressure. At a relatively low pressure of 35 bars, one may obtain conductivities of: 76 S/cm (VN), 464 S/cm (TiN) and 1.8 S/cm (WN). These are about two orders of magnitude lower than for the respective bulk materials, presumably due to both the porosity and weak particle-particle contacts at low pressure.

7. Formation Process of Nanoporous Metal (Oxy)nitrides

At relatively low temperatures under flowing ammonia, mesoporous structures of $MO_nN_m$ begin to form on the surface of the reactant oxides as shown in FIGS. 2b and 2c. At higher temperature (1000° C. for the case of $ZnCr_2O_4$), the product crystallites grow in size (as determined by PXRD) and the pores consolidate to become fewer and larger as shown in FIG. 2d. As expected, similar behavior is observed in the case of ammonolysis of $Zn_2V_2O_7$ or $Zn_2TiO_4$ in FIG. 2(e, f) and FIG. 2(g, h), respectively.

Several factors are expected to control the mesoporous morphology of the products obtained: the first is the temperature at which the rate of reaction is sufficiently fast to remove all of the Zn and most of the O from the large grained reactant oxides; the second is the bulk and surface diffusion rates of the cations and anions in any intermediates and products at the reaction temperature. As the reaction temperature increases, the pores coarsen and the grain sizes grow. Eventually with increasing temperature and time, the pores are completely eliminated. This description is consistent with that proposed for the synthesis of mesoporous elemental metals obtained by de-alloying.

8. Size of Nanoporous Structure

High reaction temperatures and long reaction times increase the length scale of the nanoporous features of the product MN. For instance, ammonolysis of $Zn_2V_2O_7$ at 600° C. (FIG. 3a) produced smaller nano-crystallites with a more open nanoporous structure than did the ammonolysis product of $Zn_2V_2O_7$ obtained at 800° C. (FIG. 2f). The calculated crystalline domain sizes of these two products were 29 and 42 nm, respectively.

9. More Complex Systems

Not surprisingly ammonolyses of $ZnTaNbO_6$ or $ZnTiNb_2O_8$ produce nitride products that contain two transition metals. Mesoporous $(Ta,Nb)_3N_5$ and $(Ti_{0.33}Nb_{0.67})N$ are observed from ammonolysis at 700-900° C. as show by SEM in FIG. 3g. The PXRD refinement of the ammonolysis product obtained from $ZnTaNbO_6$ was found to form a secondary rocksalt phase of TaN (<10%).

C. Conclusions

In this work, presented is a new processing method that results in metal (oxy)nitride nano-structured materials. The proposed mechanism is a balance between loosing internal volume by evaporation of Zn and replacement of O by fewer N on the one hand and sintering on the other hand. The sintering rate is slow enough that the porosity is not eliminated during the short heating period, since the diffusion rates in nitrides are so low. These results show that the porosity and the length scale of the nanoporous features of these materials are controlled by the identity of the transition metal, the Zn to M ratio, and the processing temperature and time.

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The use of the terminology "about," "substantially," and "substantially about" is intended to include an uncertainty of up to 10% unless otherwise indicated herein or clearly contradicted by context.

The recitation of ranges of values herein is merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention.

There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A metal nitride material having a pore size from about 10 to about 50 nanometers, wherein the metal nitride material includes at least one metal selected from the group consisting of V, Nb, Ta, Cr, W, Mo, Al, Ga and Ge.

2. The metal nitride material of claim 1 wherein the metal nitride material has a grain size from about 0.1 to about 200 microns.

3. The metal nitride material of claim 1 wherein the metal nitride material comprises a metal nitride.

4. The metal nitride material of claim 1 wherein the metal nitride material comprises a metal oxynitride.

5. A method for forming a metal nitride material comprising treating with a bonded nitrogen and hydrogen containing reducing material a mixed metal oxide material including at least one first metal susceptible to forming an unstable reaction product with the bonded nitrogen and hydrogen containing reducing material and at least one second metal susceptible to forming a stable reaction product with the bonded nitrogen and hydrogen containing reducing material to provide a mesoporous metal nitride material that includes the at least one second metal and excludes the at least one first metal.

6. The method of claim 5 wherein the treating with the bonded nitrogen and hydrogen containing reducing material is undertaken at a temperature from about 500 to about 1000 degrees centigrade.

7. The method of claim 5 wherein the metal nitride material comprises a metal nitride.

8. The method of claim 5 wherein the metal nitride material comprises a metal oxynitride.

9. The method of claim 5 wherein the at least one first metal comprises zinc.

10. The method of claim 5 wherein the at least one first metal is selected from the group consisting of an alkali metal, Cd, Hg and Pb.

11. The method of claim 5 wherein the at least one second metal is selected from the group consisting of Ti, V, Nb, Ta, Cr, W, Mo, Al, Ga and Ge.

12. The method of claim 5 wherein the bonded nitrogen and hydrogen containing reducing material is selected from the group consisting of ammonia, hydrazine, urea, methylamine and other amines.

13. A method for preparing a mesoporous metal nitride material comprising treating with ammonia a mixed metal oxide material including at least one first metal selected from the group consisting of Zn, an alkali metal, Cd, Hg and Pb susceptible to forming a volatile reaction product with ammonia and at least one second metal selected from the group consisting of Ti, V, Nb, Ta, Cr, W and Mo susceptible to forming a stable reaction product with ammonia to provide a mesoporous metal nitride material that includes the at least one second metal and excludes the at least one first metal.

14. The method of claim 13 wherein the treating with ammonia is undertaken at a temperature from about 500 to about 1000 degrees centigrade.

15. The method of claim 13 wherein the metal nitride material comprises a metal nitride.

16. The method of claim 13 wherein the metal nitride material comprises a metal oxynitride.

17. A method for forming a mesoporous metal oxide material comprising treating with a non-bonded nitrogen and hydrogen containing reducing material a mixed metal oxide material including at least one first metal susceptible to forming an unstable reaction product with the non-bonded nitrogen and hydrogen containing reducing material and at least one second metal that is susceptible to reduction with respect to the non-bonded nitrogen and hydrogen containing reducing material to provide a mesoporous metal oxide material that excludes the at least one first metal and includes the at least one second metal.

18. The method of claim 17 wherein the at least one first metal is selected from the group consisting of Zn, an alkali metal, Cd, Hg and Pb.

19. The method of claim 17 wherein the at least one second metal is selected from the group consisting of Ti, V, Nb, Ta, Cr, W, Mo, Al, Ga and Ge.

20. The method of claim 17 wherein the mesoporous metal oxide material comprises a reduced metal oxide material in comparison with the mixed metal oxide material.

21. The method of claim 17 wherein a metal nitride material is not formed along with the mesoporous metal oxide material.

22. The method of claim 5 wherein:
the mesoporous metal nitride material comprises a particle; and
mesoporous features penetrate across the entire particle in a sectional image.

23. The method of claim 13 wherein:
the mesoporous metal nitride material comprises a particle; and
mesoporous features penetrate across the entire particle in a sectional image.

* * * * *